(12) United States Patent
Schmed

(10) Patent No.: US 7,543,527 B2
(45) Date of Patent: Jun. 9, 2009

(54) CARTRIDGE CONTAINING A SINGLE SERVING OF A PARTICULATE SUBSTANCE FOR PREPARING A BEVERAGE

(75) Inventor: Arthur Schmed, Wilen b. Wollerau (CH)

(73) Assignee: Caffita System SPA (IT)

(*) Notice: Subject to any disclaimer, the term of this patent is extended or adjusted under 35 U.S.C. 154(b) by 762 days.

(21) Appl. No.: 10/383,210

(22) Filed: Mar. 6, 2003

(65) Prior Publication Data

US 2003/0172813 A1  Sep. 18, 2003

(30) Foreign Application Priority Data

Mar. 14, 2002 (DE) ................. 102 11 327

(51) Int. Cl.
  A47J 31/00 (2006.01)
  B65D 85/00 (2006.01)
  B65B 29/02 (2006.01)
(52) U.S. Cl. ............... 99/295; 99/315; 99/323; 426/77; 426/115
(58) Field of Classification Search ............ 99/295, 99/315, 314, 312, 323; 426/112, 115, 77, 426/82, 433
  See application file for complete search history.

(56) References Cited

U.S. PATENT DOCUMENTS

| | | | | |
|---|---|---|---|---|
| 1,015,407 | A * | 1/1912 | Selg | 99/306 |
| 2,199,592 | A * | 5/1940 | Holmes | 99/283 |
| 2,778,739 | A * | 1/1957 | Rodth | 426/77 |
| 3,589,272 | A * | 6/1971 | Bouladon et al. | 99/295 |
| 4,921,712 | A * | 5/1990 | Malmquist | 464/77 |
| 5,242,702 | A | 9/1993 | Fond | |
| 5,325,765 | A | 7/1994 | Sylvan et al. | |
| 5,472,719 | A | 12/1995 | Favre | |
| 6,786,134 | B2 * | 9/2004 | Green | 99/289 P |

FOREIGN PATENT DOCUMENTS

| | | |
|---|---|---|
| DE | 1924552 | 8/1970 |
| DE | 2326919 | 12/1973 |
| EP | 0211511 A1 | 2/1987 |
| EP | 0272922 A2 | 6/1988 |
| EP | 0337615 A1 | 10/1989 |
| EP | 0389141 A1 | 9/1990 |

(Continued)

*Primary Examiner*—Reginald L Alexander
(74) *Attorney, Agent, or Firm*—Maginot, Moore & Beck LLP (57) ABSTRACT

A cartridge containing a single serving of a particulate substance extractable by means of water for preparing a beverage, preferably an espresso coffee beverage is disclosed. Between the bottom of the cartridge and the particulate substance as well as between the particulate substance and the cover of the cartridge, in each case a fluid director member is provided, having a plurality of small openings. The one close to the cover serves as a water distribution member for distributing the water, fed into the cartridge through a central opening pierced therein, evenly over the particulate substance, and the one close to the bottom serves as a beverage collection member to lead the beverage to a central opening pierced into the bottom of the cartridge. Both director members are provided with a recess directed towards the interior of the cartridge, allowing the penetration of a piercing member without damage to the director members.

39 Claims, 3 Drawing Sheets

FOREIGN PATENT DOCUMENTS

| | | |
|---|---|---|
| EP | 0468078 A1 | 1/1992 |
| EP | 0554464 A1 | 8/1992 |
| EP | 1101430 A1 | 5/2001 |
| EP | 1247756 A1 | 10/2002 |
| EP | 1364605 * 11/2003 | ................. 99/295 |
| FR | 2556323 A1 | 6/1985 |
| FR | 2668451 A1 | 4/1992 |
| GB | 2023086 A | 12/1979 |

* cited by examiner

CARTRIDGE CONTAINING A SINGLE SERVING OF A PARTICULATE SUBSTANCE FOR PREPARING A BEVERAGE

BACKGROUND OF THE INVENTION

The present invention refers to a cartridge adapted to contain a single serving of a particulate substance, extractable by means of water for preparing a beverage, preferably an espresso coffee beverage, comprising an essentially cup- or bucket-shaped main body portion having a bottom portion and an open end opposite to the bottom portion, and a cover member adapted to be sealingly attached to the open end of the main body portion.

Such cartridges are well known in the art in a variety of different embodiments, whereby particularly cartridges containing a single serving of coffee powder for preparing an espresso coffee are in widespread use. One of the fundamental advantages of such cartridges may be seen in the fact that they are gas tight, thus keeping the ground coffee contained therein fresh over an extended period of time. For brewing the coffee powder received in the cartridge, predominantly semi-automatic espresso coffee machines are in use whereby the cartridge is inserted into a cartridge holder of the machine, with its cover facing downwards. Then, the cartridge holder is inserted manually into the coffee machine. The coffee machine is provided, in the region of the area where the cartridge holder is to be inserted into the machine, with a so-called brewing spike, i.e. a hollow piercing member comprising radial outlet openings for feeding the brewing water into the interior of the cartridge, once the bottom of the cartridge has been pierced upon insertion of the cartridge holder into the coffee machine. The bottom of the cartridge holder itself is provided with a plurality of projections located on a collecting tray. These projections penetrate the cover of the cartridge and provide a plurality of openings in the cover as soon as pressurized brewing water is fed into the cartridge and the cover thereof is pressed against the projections due to the hydraulic overpressure in the interior of the cartridge. During the subsequent brewing operation, the brewing water is fed into the interior of the cartridge through the brewing spike, with the result that it flows under pressure through the coffee powder in the cartridge, finally leaving the cartridge as coffee beverage through the openings in the cover. The freshly brewed coffee is collected in the collecting tray and flows through a beverage outlet out of the machine. A coffee machine comprising such a setup for the extraction of the coffee powder contained in a cartridge is disclosed, for instance, in the document EP 0,512,470.

The disadvantage of a brewing spike having radially extending outlet openings may be seen in the fact that the cross sectional area of the brewing spike relevant for the outlet of the brewing water relatively quickly clogs under the influence of contaminations. As a reason therefore, for instance fat contained in the coffee powder, coffee powder particles, lime in the brewing water etc. can be named. However, the brewing spike being gradually more and more contaminated, the quality of the brewed coffee beverage gradually decreases. As far as the hydrodynamic standpoint is concerned, the problem in using brewing spikes of the kind referred to herein before is the fact that so-called dead volumes exist in the interior of the cartridge, with the result that portions of the coffee powder are extracted not at all or only to a minor extent.

PRIOR ART

The document EP 0,521,188 discloses an apparatus for extracting coffee powder contained in a cartridge. Besides a brewing spike for feeding brewing water into the interior of the cartridge, a water distribution grid is provided in a preferred embodiment, having elements projecting from its bottom to perforate the top portion of the cartridge. The brewing water is distributed over the top of the cartridge by the water distribution grid and can flow into the cartridge through the gap between the projecting elements and the cover of the cartridge.

Moreover, the document EP 0,512,468 discloses a cartridge referred to herein and adapted to contain a single serving of coffee powder. The cartridge is made of a composite material, does not comprise any filter and no portions with reduced strength, whereby the bottom and the cover of the cartridge are adapted to break up under the influence of the pressure exerted by the extraction fluid at the beginning of the extraction process.

A fundamental disadvantage of the known cartridges containing a single serving of an extractable particulate substance, e.g. coffee powder, may be seen in the fact that a lot of effort has to be taken at the end of the coffee machine to ensure that the coffee powder contained in the cartridge is as fully extracted as possible, i.e. to ensure that the brewing water flows uniformly through the entirety of the coffee powder. Moreover, with cartridges that open up only under the influence of the pressure exerted by the extraction fluid, at the beginning of the extraction, the danger exists that they do not open at the desired locations and are not perforated where desired, respectively, with the result that the coffee powder is insufficiently extracted again. Finally, as further disadvantage lies in the fact that the perforations often are too big; this is far from desirable because the extracting fluid is not opposed to a sufficiently high flow resistance, whereby there is also the danger that coffee powder can leave the cartridge, thereby contaminating the coffee machine unnecessarily.

The document EP 1,101,430 discloses a beverage-filter-cartridge system, comprising a staggered single serving cartridge. The cartridge comprises several steps for supporting a filter element and a porous diaphragm, respectively. The beverage powder is received between the filter element and the diaphragm. Both between the cover of the cartridge and the filter element and between the bottom of the cartridge and the diaphragm, a cavity is provided for laterally inserting an inlet tube and an outlet tube, respectively.

Finally, U.S. Pat. No. 2,778,739 discloses a package for beverage infusion material. The package comprises a bowl-shaped housing, containing a metallic insert. The top of the housing is provided with a welded-on cover. The afore mentioned insert comprises a circular outer recess and an inner, central recess. The central recess is deeper than the outer recess and is adapted to receive a piercing member by means of which the bottom of the package is perforated. The piercing member simultaneously serves for feeding brewing water. The insert comprises a plurality of openings through which the brewing water can flow into the interior of the package. For perforating the package cover, further perforating means are provided.

OBJECTS OF THE INVENTION

It is an object of the invention to provide a cartridge adapted to contain a single serving of a particulate substance, extractable by means of water for preparing a beverage, preferably an espresso coffee beverage, in which the brewing water flows through the extractable substance contained therein as uniformly as possible to thereby extract the substance as fully as possible.

It is a further object of the invention to provide a cartridge adapted to contain a single serving of a particulate substance, extractable by means of water for preparing a beverage, preferably an espresso coffee beverage, in which the associated coffee machine can be kept as simple as possible, removing the need to provide the machine with means for distributing and/or collection the brewing water and the beverage, respectively, with regard to the cartridge.

It is a still further object of the invention to provide a cartridge adapted to contain a single serving of a particulate substance, extractable by means of water for preparing a beverage, preferably an espresso coffee beverage, in which the brewing water can flow through the cartridge either from cover to bottom or vice versa, without the need to provide substantial structural modifications to the cartridge.

SUMMARY OF THE INVENTION

To meet these and other objects, the invention provides a cartridge adapted to contain a single serving of a particulate substance, extractable by means of water for preparing a beverage, comprising an essentially cup- or bucket-shaped main body portion having a bottom portion and an open end opposite to said bottom portion, a cover member adapted to be sealingly attached to the open end of the main body portion, and at least one fluid director member having essentially disc-shaped configuration with a central longitudinal axis and a dimension essentially corresponding to the interior cross sectional dimension of the main body portion, the fluid director member adapted to be received in the interior of the main body portion.

Each fluid director member is provided with a plurality of openings and a plurality of embossings, each of the embossings having a raised portion, whereby a plurality of communicating fluid channels is created between the raised portions of the embossings.

By providing at least one fluid director member of the kind explained herein above, for example at the inlet side of the cartridge above the particulate substance, a uniform distribution of the water fed into the cartridge for extracting the particulate substance can be ensured, independent of the number and the size of the inlet perforations.

Preferably, two fluid director members are provided, a first one upstream the particulate substance and serving as a fluid distribution member and a second one downstream the particulate substance and serving as a fluid collector member. Besides a uniform distribution of the brewing water, as explained above, such an embodiment has the advantage that the particulate substance is enclosed between the two fluid director members, thereby preventing any particles of that substance to escape through the inlet and/or outlet perforation(s), even if these should be relatively big.

Particularly, in a preferred embodiment, the cartridge comprises a first fluid director member having a plurality of openings and a plurality of embossings, each of the embossings having a raised portion, whereby a plurality of communicating fluid channels is created between the raised portions of the embossings, and whereby the first fluid director member is located in the interior of the cartridge between the particulate substance and the cover member, thereby constituting a distribution member for the water flowing through said particulate substance. The raised portions of the embossings rest on the cover member such that the raised portions of the embossings and the cover member delimit the fluid channels.

In that preferred embodiment, the cartridge further comprises a second fluid director member also having a plurality of openings and a plurality of embossings, each of the embossings having a raised portion, whereby a plurality of communicating fluid channels is created between the raised portions of the embossings, and whereby the second fluid director member is located in the interior of the cartridge between the particulate substance and the bottom of the main body portion, thereby constituting a collection member for the water flowing through said particulate substance. The raised portions of the embossings of the second fluid director member rest on the bottom portion such that the raised portions of the embossings and the bottom portion delimit the fluid channels.

In both the first and the second fluid director members, openings are located in the fluid channels created between the raised portions of the embossings, and both the first and second fluid director members comprise at least one recess projecting in a direction opposite to the direction of the raised portions of the embossings for providing space to receive a piercing member penetrating the cover member and/or the bottom portion without the first and/or second fluid director members being damaged by the piercing member.

BRIEF DESCRIPTION OF THE DRAWINGS

In the following, embodiments of the cartridge according to the invention will be further described, with reference to the accompanying drawings, in which.

DETAILED DESCRIPTION OF THE PREFERRED EMBODIMENTS

Figure 1:
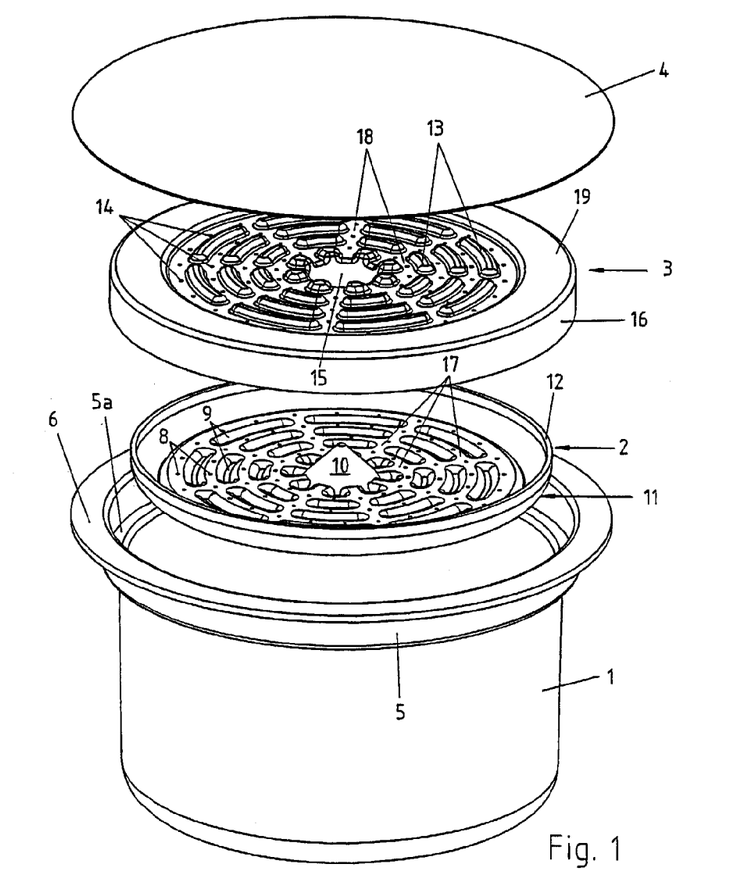
FIG. 1 shows an exploded view of a still empty cartridge.

The general design of a cartridge adapted to receive a single serving of a particulate substance, extractable by means of water for preparing a beverage, is shown in FIG. 1 in an exploded view and shall be further explained herein below. Even if such cartridges basically are adapted to contain various different particulate substances extractable by means of water in order to prepare a beverage, in the following, embodiments of the cartridge are further described which are particularly suitable to contain coffee powder for preparing normal coffee or so-called espresso coffee.

As viewed from bottom to top of FIG. 1, the cartridge comprises a bucket- or cup-shaped main housing portion 1, a lower fluid collection member 2, an upper fluid distribution member 3 and a cover 4. The coffee powder, to be received in the main housing portion 1 between the fluid collection member 2 and the fluid distribution member 3, is omitted from this illustration for clarity's sake. Both, the main housing portion 1 and the cover 4 consist of a gas-tight multi-layer composite foil material. The fluid collection member 2 and the fluid distribution member 3 both are generally disc-shaped and are manufactured preferably by deep drawing.

The main portion 1 of the cartridge, slightly conical by having an increasing diameter from bottom to top, is provided with a peripheral portion 5 with greater diameter, thus having an annular shoulder 5a at the inner side of the wall of the main portion 1 of the cartridge. This shoulder 5a serves as a support for the upper distribution member 3, i.e. the upper distribution member 3, once inserted into the main portion 1 of the cartridge, rests on the shoulder 5a. The main portion 1 of the cartridge comprises a peripheral rim 6, and the cover 4 is fixed to that peripheral rim 6 e.g. by gluing or welding.

The collection member 2 is provided with a plurality of embossings having the shape of annular segments; these embossings show as raised portions 9 protruding from the bottom surface of the lower collection member 2. Once the collection member 2 having been inserted into the main portion 1 of the cartridge, the raised portions 9 rest on the flat bottom surface of the main portion 1, with the result that a plurality of fluid channels 17 are created, running from the central longitudinal axis of the collection member 2 radially outwards and concentrically around the central longitudinal axis of the collection member 2. Beside the raised portions 9, i.e. in the region of the thus created fluid channels 17, the collection member 2 is provided with a plurality of openings 8. The center of the collection member 2 comprises a conically shaped recess 10, directed towards the interior of the cartridge, i.e. in opposite direction as compared to the raised portions 9. The generally flat central portion of the collection member 2 merges in a radius 11 into a cylindrical edge portion 12 directed upward, as seen in FIG. 1. By this design, a tilt of the collection member 2 is avoided when it is inserted into the main portion 1 of the cartridge.

As far as the design is concerned, the upper distribution member 3 is essentially a mirror image of the lower collection member 2. Again, the distribution member 3 comprises a plurality of embossings having the shape of annular segments; these embossings show as raised portions 13 protruding from the top surface of the upper distribution member 3. By means of these raised portions 13, a plurality of fluid channels 18 are created at the top surface of the upper distribution member 3, these fluid channels 18 running from the central longitudinal axis of the distribution member 3 radially outwards and concentrically around the central longitudinal axis of the distribution member 3. Beside the raised portions 18, i.e. in the region of the thus created fluid channels 18, the distribution member 3 is provided with a plurality of openings 14. The center of the distribution member 3 comprises a conically shaped recess 15, directed towards the interior of the cartridge, i.e. in opposite direction as compared to the raised portions 13. Along the periphery of the upper distribution member 3, a first flat edge portion 19 is provided. The first flat edge portion 19 is raised with regard to the fluid channels 18, and its top surface essentially flushes with the topmost portions of the raised portions 13. An essentially cylindrical second edge portion 16 surrounds the first edge portion 19 and extends downwards, as seen in FIG. 1, i.e. in the same direction as the recess 15 provided in the center of the upper distribution member 3 and in opposite direction as compared to the raised portions 13.

Upon insertion of the upper distribution member 3 into the main portion 1 of the cartridge, the distribution member 3 rests with the lower edge of the second edge portion 16 on the shoulder 5a of the enlarged peripheral portion 5 of the main portion 1 of the cartridge.

When hot brewing water is fed under pressure into the cartridge 1 for preparing e.g. a coffee beverage, as will be explained in more detail herein after, the upper distribution member 3 serves both as a filter and as a distributing means for the brewing water, while the lower collection member 2 similarly serves as a filter and as a collecting means for the prepared coffee beverage.

Figure 2:
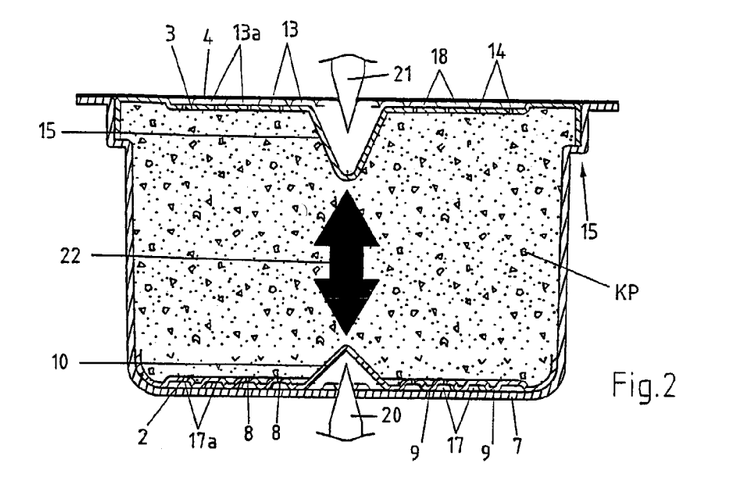
FIG. 2 shows a central longitudinal sectional view of a first embodiment of the cartridge according to the invention.

FIG. 2 shows a longitudinal sectional view of an assembled cartridge, containing a single serving of coffee powder KP. As can be seen in this drawing, the coffee powder KP is enclosed between the lower collection member 2 and the upper distribution member 3. Moreover, it can be clearly seen that fluid channels 17 are created by the raised portions 9 of the lower collection member 2 resting on the bottom of the main cup- or bucket-shaped main portion 1 of the cartridge. Similarly, fluid channels 18 are created by the raised portions 9 of the upper distribution member 3 resting on the bottom surface of the cover 4 of the main portion 1 of the cartridge.

For perforating the cartridge, an upper piercing member 21 and a lower piercing member 20 are provided, adapted to be pushed through the cover 4 and the bottom of the main portion 1 of the cartridge, respectively. Particularly, the piercing members 20, 21 are pushed through the cover 4 and the bottom of the main, portion 1 of the cartridge above and below, respectively, and the recesses 15 and 10 provided in the distribution member 3 and the collection member 2, respectively, receive the piercing members 21, 20. Thus, upon piercing the cover 4, the upper distribution member 3 is not damaged by the piercing member 21; similarly, upon piercing the bottom of the main portion 1 of the cartridge, the lower collection member 2 is not damaged by the piercing member 20, since the piercing members 20 and 21, respectively, extend into the recesses 15 and 10, respectively.

Preferably, the brewing water, required for brewing the coffee powder KP contained in the cartridge, is fed into the interior of the cartridge from the outside through the perforation provided by the piercing member 21, as it is explained in more detail in the document EP 01 810 498, and the prepared coffee beverage leaves the cartridge through the perforation provided by the piercing member 20. However, it is not compulsory at all that the brewing water be fed to a central inlet perforation and the coffee beverage leaves the cartridge through a central outlet perforation of the cartridge. However, important is that the brewed coffee beverage, by providing the collection member 2, can flow as unobstuctedly as possible to the outlet opening or if appropriate, outlet openings.

In the present example, it will be assumed that the brewing water is led through the cartridge from top to bottom, as seen in FIG. 2. However, it is easily possible to have the brewing water flow through the cartridge in the opposite direction, i.e. from the bottom to the top, as seen and symbolized in FIG. 2 by the double arrow 22.

Under the influence of the fluid channels 18, the brewing water fed into the cartridge is evenly distributed over the entire cross sectional area of the cartridge. Then, the brewing water flows through the openings 14 provided in the upper distribution member 3 and continuous its flow through the coffee powder KP contained in the cartridge. Having passed and thereby extracted the coffee powder, the brewing water, i.e. now being the brewed beverage, passes the openings 8 provided in the lower collection member 2 and flows to the bottom side of the collection member 2. Finally, the coffee beverage flows through the fluid channels 17 located at the bottom of the main portion 1 of the cartridge and defined by the raised portions 9 of the collection member 2 to a central outlet opening, created by the piercing member 20. There, it escapes the cartridge and continues its path along not shown means to a (not shown) beverage outlet.

By providing a cartridge with a distribution member 3 and a collection member 2, designed as described herein above, it is ensured that the brewing water homogenously flows through the entirety of the coffee particles contained in the cartridge to achieve a uniform extraction of the entire coffee powder. In the case where the brewing water flows through the cartridge from bottom to top, the function of the distribution member 3 and the collection member 2 is interchanged, the lower member 2 now acting as a distribution member and the upper member 3 now acting as a collection member. In this context, the designations "distribution member 3" and "collection member 2" refer to the mode of operation with the brewing water flowing from top to bottom, but should not be understood as limiting in any way.

In any case, the raised portions 9, 13 are distributed over the area of the distribution member 3 and the collection member 2, respectively, such that the distribution and collection members 3, 2 rest uniformly, over their entire surface area, on the bottom of the main portion 1 and the cover 4, respectively. This is particularly advantageous in the case, as described herein above, if the brewing water is fed into the cartridge through a central piercing. By the aforementioned uniform support of the distribution and collection members 3, 2, it is ensured that the cavities 13a, 17a constituting the fluid channels 18, 17 are kept open even if a substantial external pressure is exerted on the cartridge. If appropriate, the interior of the cartridge may comprise vertical separator walls (not shown), contributing to an even more uniform flow of the brewing water through the coffee powder and/or to the rigidity of the cartridge itself.

The diameter of the openings 8, 14 provided in the distribution member 2 and in the collection member 3 preferably is smaller than the statistical diameter of a single coffee powder particle used to prepare the beverage, and even more preferably smaller than x-σ, whereby x is the statistical mean value of the diameter of a particle and σ is the standard deviation. Thereby, it is ensured that, in practice, no particles can escape from or are flushed out of the interior of the cartridge, independent of the size of the piercing.

Figure 3:
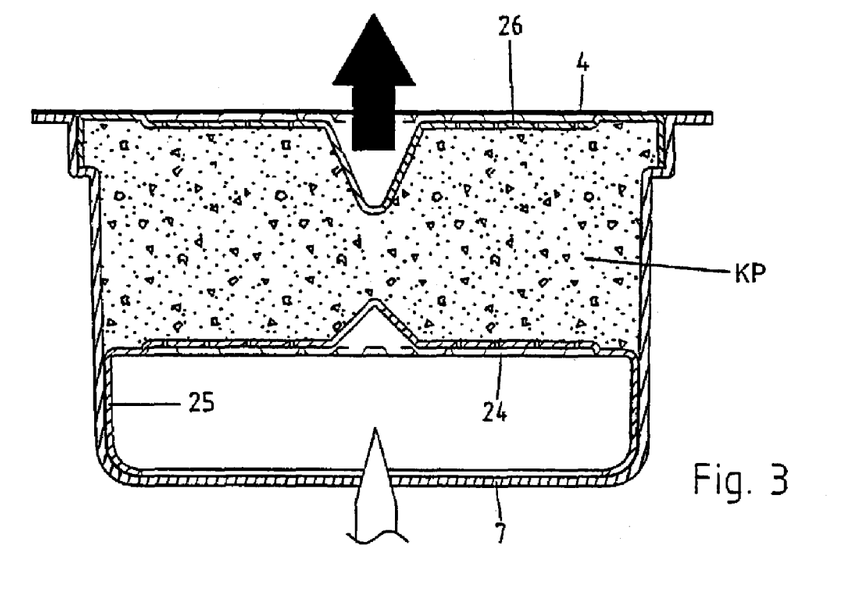
FIG. 3 shows a central longitudinal sectional view of a second embodiment of the cartridge according to the invention.

FIG. 3 shows a longitudinal sectional view of a second embodiment of a cartridge according to the invention that is not fully loaded with coffee powder KP. By the provision of an auxiliary frame member 25, the lower distribution member 24 is kept in such a distance from the bottom 7 of the cartridge that the coffee powder fully occupies the space between the lower distribution member 24 and the upper collection member 26. Thereby, it can be avoided that the coffee powder KP is contained in the cartridge in uneven distribution; such a situation would result in the fact that the brewing water would not be evenly distributed in the interior of the cartridge, further resulting in some sort of hydraulic short circuit. Thereby, the brewing water would not evenly extract the coffee powder. In this embodiment, the brewing water should be fed into the interior of the cartridge from the bottom 7 thereof, since the lower distribution member 24 cannot take high hydraulic pressure forces acting in the direction towards the bottom 7 of the cartridge.

Figure 4:
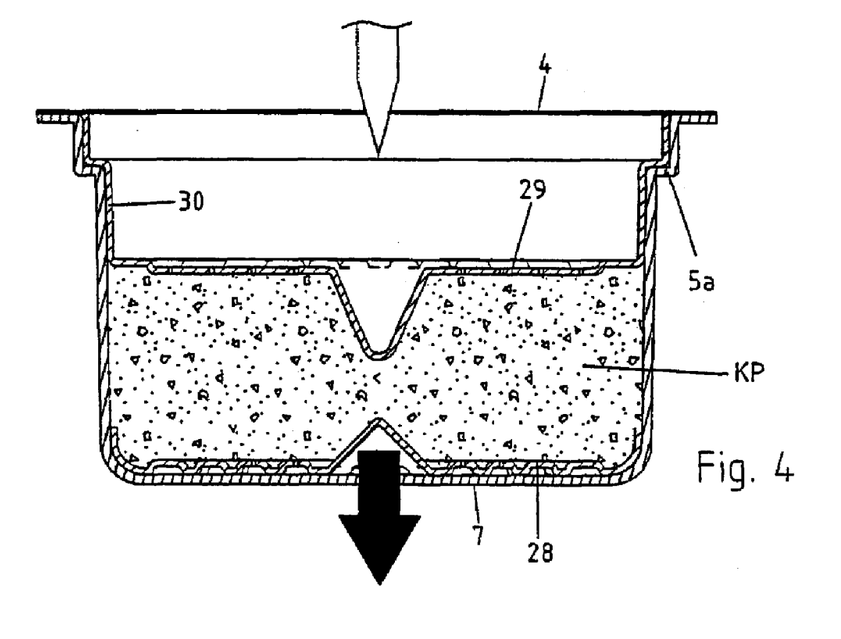
FIG. 4 shows a central longitudinal sectional view of a third embodiment of the cartridge according to the invention.

FIG. 4 shows a longitudinal sectional view of a third embodiment of a cartridge according to the invention, again not fully loaded with coffee powder KP. By the provision of an auxiliary frame member 30 resting on the shoulder 5a and the cover 4, the upper collection member 29 is kept in such a distance from the cover 4 of the cartridge that the coffee powder fully occupies the space between the upper distribution member 29 and the lower collection member 28. In this embodiment, the brewing water is fed through the cover 4 into the interior of the cartridge.

Figure 5:
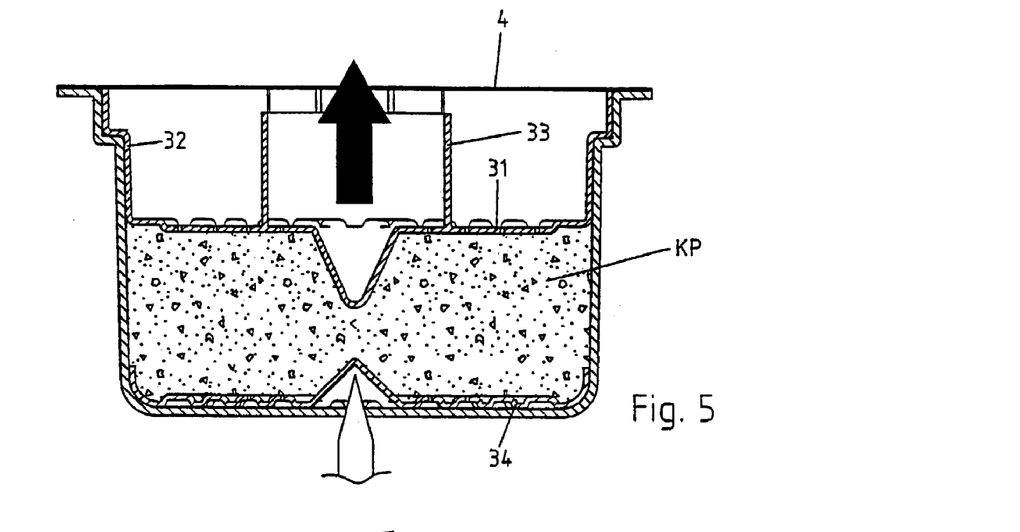
FIG. 5 shows a central longitudinal sectional view of a forth embodiment of the cartridge according to the invention.

FIG. 5 shows a longitudinal sectional view of a fourth embodiment of a cartridge according to the invention, similar to the third embodiment, that is again not fully loaded with coffee powder KP. Similarly, by the provision of an auxiliary frame member 32, the upper collection member 31 is kept in such a distance from the cover 4 of the cartridge that the coffee powder fully occupies the space between the upper collection member 31 and the lower distribution member 28. However, in this embodiment, the frame 32 is designed to be rigid by the provision of an annular inner portion 33 and a plurality of vertical struts (not shown in FIG. 5). Thus, the brewing water can be fed into the cartridge from the bottom, as indicated by the solid arrow. It is understood that the frame 32, 33, in operation, does not rest on the cover 4 of the cartridge, but on suitable elements provided on the coffee machine (not shown). It is further understood that the brewing water could be fed into the cartridge from the other side, i.e. through the cover 4.

Figure 6:
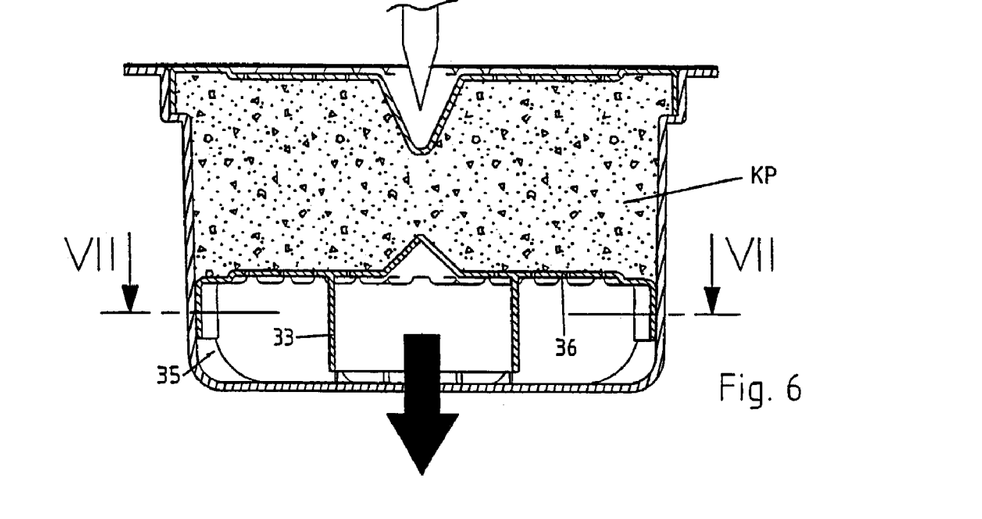
FIG. 6 shows a central longitudinal sectional view of a fifth embodiment of the cartridge according to the invention.

FIG. 6 shows a longitudinal sectional view of a fifth embodiment of a cartridge according to the invention, similar to the second embodiment, again not fully loaded with coffee powder KP. In this embodiment, the lower collection member 36 is supported on the bottom 7 of the cartridge by means of a pressure resistant rigid frame 35.

Figure 7:
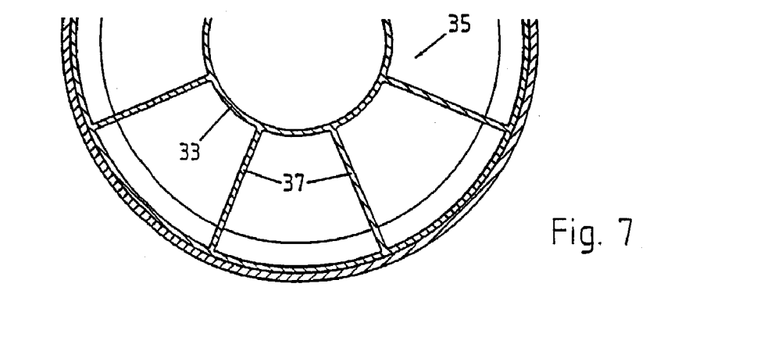
FIG. 7 shows a partial cross sectional view of the fifth embodiment of the cartridge along the lines VII-VII in FIG. 6.

Finally, FIG. 7 shows a partial cross sectional view of the fifth embodiment of the cartridge taken along the line VII-VII in FIG. 6. In this view, the annular inner portion 33 and the vertical struts 37 of the frame 5 are clearly visible.

If the distribution member or the collection member is located in a certain distance from the bottom 7 and the cover 4 of the cartridge, respectively, there is no need to provide recesses 10 and 15, respectively, in the collection and distribution members, respectively, for receiving the piercing member 20 or 21, since the piercing member 20 or 21 can extend into the free space between bottom 7 and cover 4, respectively, of the cartridge and distribution and collection member, respectively, without damaging the one or the other one of these members.

Instead of a central, conically shaped recess 10, 15, for receiving the piercing member 20 or 21, for instance an annular recess having a conical cross section could be provided. Such an annular recess would be useful in case of providing a plurality of piercing members distributed along a circular path. Further, instead of a conically shaped recess, for example a hemispherical recess or a recess in the shape of a rectangular parallelepiped could be provided. In order to facilitate the piercing of the cover or the bottom of the cartridge by means of the piercing member, the bottom or the cover of the cartridge could be provided with an area having reduced strength. However, such reduced strength area would have to be designed such that the layer of the multiplayer composite foil that is gas tight will not be impaired. All these afore mentioned embodiments are not specifically shown in the drawings.

With a cartridge designed according to the invention and as herein before described, a number of advantages can be realized:

By the provision of a distribution member, the brewing water entering the interior of the cartridge is evenly distributed over the entire cross sectional area of the cartridge, resulting an an uniform extraction of the coffee powder. The same is true even if the cartridge is not fully loaded with coffee powder.

Escaping or flushing out of coffee powder particles is avoided to a great extent, resulting in a considerable reduction of the contamination of the coffee machine. Insofar, also the size of the piercing of the cartridge is of subaltern importance.

The size of the piercing is of no further importance regarding the flow velocity of the brewing water, because the brewing water hits a constant flow resistance, independent from the size of the piercing, but determined by the size of the openings in the fluid director members.

The coffee powder cartridges according to the embodiments shown in FIGS. 2, 5 and 6 can be universally used because it does not matter in what direction the brewing water flows through the cartridge, be it from top to bottom or vice versa.

Only one single piercing has to be provided both at the side facing the distribution member and at the side facing the collection member.

What is claimed is:

1. A single serving cartridge for a beverage brewing machine comprising:
   a housing configured for mounting with the beverage brewing machine and having closed opposite ends;
   a particulate beverage substance from which the beverage is extracted in the brewing machine, said particulate substance contained within said housing and having a statistical mean diameter of the particles of said substance; and
   a fluid director member disposed within said housing between said particulate substance and one of said opposite ends, said fluid director member dimensioned to correspond to an interior cross-sectional area of said housing,
   said fluid director member defining a plurality of openings for passage of a fluid therethrough, said openings having a diameter that is less than said statistical mean diameter of said particles, and
   said fluid director member further including a plurality of raised portions defining a plurality of fluid channels therebetween arranged to direct fluid flow to or from said plurality of openings, a first number of said fluid channels extend radially outward from a central axis defined by said fluid director member, and a second number of said fluid channels extend concentrically around said central axis.

2. The single serving cartridge of claim 1, wherein said plurality of openings are located within said plurality of fluid channels.

3. The single serving cartridge of claim 1, wherein said raised portions and said fluid channels are evenly distributed substantially over an entire face of said fluid director member.

4. The single serving cartridge of claim 1, wherein said fluid director member is supported within said housing such that a piercing element may pierce at least one of said opposite ends without piercing said fluid director member.

5. The single serving cartridge of claim 1, wherein said raised portions on said fluid director member are raised toward and are in contact with said one of said opposite ends.

6. The single serving cartridge of claim 5, wherein said fluid director member further includes a recess projecting in a direction opposite to the direction of said raised portions.

7. The single serving cartridge of claim 1, wherein at least one of said opposite ends is provided with an area having reduced mechanical strength to facilitate piercing by a piercing element.

8. The single serving cartridge of claim 1, wherein one of said opposite ends includes a cover member sealingly attached thereto.

9. The single serving cartridge of claim 8, wherein said housing defines an interior shoulder for supporting said fluid director member adjacent said one of said opposite ends.

10. A cartridge adapted to contain a single serving of a particulate substance having a statistical mean diameter of a particle of the substance, the particulate substance extractable by means of water for preparing a beverage, said cartridge comprising:
    an essentially cup- or bucket-shaped main body portion having a bottom portion configured to contain the particulate substance and an open end opposite said bottom portion;
    a cover member attached to and covering said open end of said main body portion; and
    at least one fluid director member sized to be received within the interior of said main body portion and having a dimension essentially corresponding to the interior cross sectional dimension of said main body portion,
    said fluid director member defining a plurality of openings for passage of fluid therethrough, each of said openings having a diameter less than the statistical mean diameter of a particle of the substance, and
    said fluid director member further including a plurality of raised portions, said raised portions defining a plurality of fluid channels therebetween arranged to direct fluid flow to or from said plurality of openings, a first number of said fluid channels extending radially outward from a central longitudinal axis of said fluid director member, and a second number of said fluid channels extending concentrically around said central longitudinal axis.

11. The cartridge according to claim 10 wherein said openings are located within said fluid channels.

12. The cartridge according to claim 11 wherein said fluid channels are evenly distributed substantially over an entire surface of said fluid director member.

13. A cartridge adapted to contain a single serving of a particulate substance having a statistical mean diameter of a particle of the substance, the particulate substance extractable by means of water for preparing a beverage, said cartridge comprising:
    an essentially cup- or bucket-shaped main body portion having a bottom portion configured to contain the particulate substance and an open end opposite said bottom portion;
    a cover member attached to and covering said open end of said main body portion; and
    at least one fluid director member sized to be received within the interior of said main body portion and having a dimension essentially corresponding to the interior cross sectional dimension of said main body portion,
    said fluid director member defining a plurality of openings for passage of fluid therethrough, each of said openings having a diameter less than the statistical mean diameter of a particle of the substance, and
    said fluid director member further including a plurality of raised portions, said raised portions defining a plurality of fluid channels therebetween arranged to direct fluid flow to or from said plurality of openings, and wherein at least one of said cover member and said bottom portion of said main body portion is configured to be pierced by a piercing element to form a fluid opening; and said main body portion is configured to support said fluid director member offset from said at least one of said cover member and said bottom portion such that the piercing element may pierce said at least one of said cover member and said bottom portion without piercing said fluid director member.

14. A cartridge adapted to contain a single serving of a particulate substance having a statistical mean diameter of a particle of the substance, the particulate substance extractable by means of water for preparing a beverage, said cartridge comprising:

an essentially cup- or bucket-shaped main body portion having a bottom portion configured to contain the particulate substance and an open end opposite said bottom portion;

a cover member attached to and covering said open end of said main body portion; and at least one fluid director member sized to be received within the interior of said main body portion and having a dimension essentially corresponding to the interior cross sectional dimension of said main body portion, said fluid director member defining a plurality of openings for passage of fluid therethrough, each of said openings having a diameter less than the statistical mean diameter of a particle of the substance, and said fluid director member further including a plurality of raised portions, said raised portions defining a plurality of fluid channels therebetween arranged to direct fluid flow to or from said plurality of openings, and wherein at least one of said cover member and said bottom portion of said main body portion is configured to be pierced by a piercing element to form a fluid opening; and said fluid director member further defines a recess projecting in a direction to receive the piercing element when said piercing element pierces said at least one of said cover member and said bottom portion, such that said piercing element does not pierce said fluid director member.

15. The cartridge according to claim 14 in which said recess has an essentially conical shape.

16. The cartridge according to claim 14 wherein said at least one of said cover member and said bottom portion is provided with an area having reduced mechanical strength to facilitate the piercing thereof by the piercing element.

17. A cartridge containing a single serving of a particulate substance, extractable by means of water for preparing a beverage, comprising:

an essentially cup- or bucket-shaped main body portion having a bottom portion and an open end opposite to said bottom portion;

a cover member sealingly attached to said open end of said main body portion; and a fluid director member having essentially disc-shaped configuration with a central longitudinal axis and a dimension essentially corresponding to the interior cross sectional dimension of said main body portion;

said fluid director member having a plurality of openings and a plurality of embossings, each of said embossings having a raised portion, whereby a plurality of communicating fluid channels is created between said raised portions of said embossings, a first number of said fluid channels extending radially outwards from said central longitudinal axis and a second number of said fluid channels extending concentrically around said central longitudinal axis, and said fluid director member being located in the interior of said cartridge between said particulate substance and said cover member of said main body portion, thereby constituting a distribution member for the water flowing through said particulate substance.

18. The cartridge according to claim 17 wherein said raised portions of said embossings rest against said cover member, said fluid channels being delimited by said raised portions of said embossings and said cover member.

19. The cartridge according to claim 17 wherein said openings are located in said fluid channels created between said raised portions of said embossings.

20. The cartridge according to claim 17 wherein said embossings and said fluid channels, respectively, are evenly distributed substantially over the entire surface of said fluid director member.

21. The cartridge according to claims 17 in which said fluid director member is configured such that one or more piercing elements may penetrate said cover member of said main body portion without piercing said fluid director member.

22. A cartridge containing a single serving of a particulate substance, extractable by means of water for preparing a beverage, comprising:

an essentially cup- or bucket-shaped main body portion having a bottom portion and an open end opposite to said bottom portion;

a cover member sealingly attached to said open end of said main body portion; and a fluid director member having essentially disc-shaped configuration with a central longitudinal axis and a dimension essentially corresponding to the interior cross sectional dimension of said main body portion;

said fluid director member having a plurality of openings and a plurality of embossings, each of said embossings having a raised portion, whereby a plurality of communicating fluid channels is created between said raised portions of said embossings, said fluid director member being located in the interior of said cartridge between said particulate substance and said cover member of said main body portion, thereby constituting a distribution member for the water flowing through said particulate substance, and.

said fluid director member further including at least one recess projecting in a direction opposite to the direction of said raised portions of said embossings.

23. The cartridge according to claim 22 wherein said fluid director member comprises one central recess.

24. The cartridge according to claim 23 in which said central recess has essentially conical, hemispherical or cubic shape.

25. A single serving cartridge for a beverage brewing machine comprising:

a housing configured for mounting with the beverage brewing machine and having closed opposite ends;

a particulate beverage substance from which the beverage is extracted in the brewing machine, said particulate substance contained within said housing and having a statistical mean diameter of the particles of said substance; and a fluid director member disposed within said housing between said particulate substance and one of said opposite ends, said fluid director member dimensioned to correspond to an interior cross-sectional area of said housing, said fluid director member defining a plurality of openings for passage of a fluid therethrough, said openings having a diameter that is less than said statistical mean diameter of said particles, said fluid director member further including a plurality of raised portions defining a plurality of fluid channels therebetween arranged to direct fluid flow to or from said plurality of openings, and said fluid director member further defines a recess positioned such that a piercing element may pierce said one of said opposite ends and extend into said recess without piercing said fluid director member.

26. The single serving cartridge of claim 25, wherein said recess is conical.

27. A single serving cartridge for a beverage brewing machine comprising:
a housing configured for mounting with the beverage brewing machine and having closed opposite ends;
a particulate beverage substance from which the beverage is extracted in the brewing machine, said particulate substance contained within said housing and having a statistical mean diameter of the particles of said substance;
a first fluid director member disposed within said housing between said particulate substance and one of said opposite ends, said fluid director member dimensioned to correspond to an interior cross-sectional area of said housing; and
a second fluid director member disposed within said housing between said particulate substance and the other of said opposite ends, wherein
said first and second fluid director members configured substantially identically, each defining a plurality of openings for passage of a fluid therethrough, said openings having a diameter that is less than said statistical mean diameter of said particles, and each further including a plurality of raised portions defining a plurality of fluid channels therebetween arranged to direct fluid flow to or from said plurality of openings.

28. The single serving cartridge of claim 27, wherein both of said opposite ends are provided with an area having reduced mechanical strength to facilitate piercing by a piercing element.

29. The single serving cartridge of claim 28, wherein both of said fluid director members are supported within said housing such that a piercing element may pierce a corresponding one of said opposite ends without piercing said fluid director member.

30. The single serving cartridge of claim 28, the brewing machine having a piercing element, wherein both of said fluid director members defines a recess positioned such that a piercing element may pierce a corresponding one of said opposite ends and extend into said recess without piercing said fluid director member.

31. The single serving cartridge of claim 30, wherein said recess is conical.

32. A cartridge containing a single serving of a particulate substance, extractable by means of water for preparing a beverage, comprising:
an essentially cup- or bucket-shaped main body portion having a bottom portion and an open end opposite to said bottom portion;
a cover member sealingly attached to said open end of said main body portion;
two fluid director members, each having an essentially disc-shaped configuration with a central longitudinal axis and a dimension essentially corresponding to the interior cross sectional dimension of said main body portion;
each fluid director member having a plurality of openings and a plurality of embossings, each of said embossings having a raised portion;
a first one of said fluid director members being located in the interior of said cartridge between said particulate substance and said cover member of said main body portion, and a second one of said fluid director members being located between said particulate substance and said bottom portion of said main body portion, thereby constituting respectively a distribution member for the water flowing through said particulate substance or a collection member for the water flowing through said particulate substance.

33. The cartridge of claim 32, wherein a plurality of communicating fluid channels is created between said raised portions of said embossings.

34. A cartridge containing a single serving of a particulate substance, extractable by means of water for preparing a beverage, comprising:
an essentially cup- or bucket-shaped main body portion having a bottom portion and an open end opposite to said bottom portion;
a cover member sealingly attached to said open end of said main body portion;
a first fluid director member having essentially disc-shaped configuration with a central longitudinal axis and a dimension essentially corresponding to the interior cross sectional dimension of said main body portion;
said fluid director member having a plurality of openings and a plurality of embossings, each of said embossings having a raised portion, whereby a plurality of communicating fluid channels is created between said raised portions of said embossings,
said first fluid director member being located in the interior of said cartridge between said particulate substance and said cover member of said main body portion, thereby constituting a distribution member for the water flowing through said particulate substance, and
said raised portions of said embossings resting on said cover member, said fluid channels being delimited by said raised portions of said embossings and said cover member; and
a second fluid director member having essentially disc-shaped configuration with a central longitudinal axis and a dimension essentially corresponding to the interior cross sectional dimension of said main body portion;
said second fluid director member having a plurality of openings and a plurality of embossings, each of said embossings having a raised portion, whereby a plurality of communicating fluid channels is created between said raised portions of said embossings;
said second fluid director member being located in the interior of said cartridge between said particulate substance and said bottom portion of said main body portion, thereby constituting a collection member for the water flowing through said particulate substance; and
said raised portions of said embossings of said second fluid director member resting on said bottom portion, said fluid channels being delimited by said raised portions of said embossings and said bottom portion.

35. Cartridge according to claim 34 in which said openings are located in said fluid channels created between said raised portions of said embossings.

36. Cartridge according to claim 34 in which at least one of said first and second fluid director members comprises at least one recess projecting in a direction opposite to the direction of said raised portions of said embossings for receiving a piercing member penetrating said cover member and/or said bottom portion without said first and/or second fluid director members being damaged.

37. A single serving cartridge for a beverage brewing machine having a piercing element, the cartridge comprising:
- a housing configured for mounting with the beverage brewing machine and having closed opposite ends;
- a particulate beverage substance from which the beverage is extracted in the brewing machine, said particulate substance being contained within said housing and having a statistical mean diameter of the particles of said substance;
- a first fluid director member disposed within said housing between said particulate substance and one of said opposite ends, said fluid director member dimensioned to correspond to an interior cross-sectional area of said housing; and
- a second fluid director member disposed within said housing between said particulate substance and the other of said opposite ends, wherein
- said first and second fluid director each define a plurality of openings for passage of a fluid therethrough, said openings having a diameter that is less than said statistical mean diameter of said particles, and
- wherein said first and second fluid director members each define a recess positioned such that a piercing element may pierce a corresponding one of said opposite ends and extend into said recess without piercing said fluid director member.

38. The single serving cartridge of claim 37, wherein each of said recesses projects toward the particulate beverage substance.

39. A cartridge containing a single serving of a particulate substance, extractable in a brewing machine, having a piercing member, by means of water for preparing a beverage, comprising:
- an essentially cup- or bucket-shaped main body portion having a bottom portion and an open end opposite to said bottom portion;
- a cover member sealingly attached to said open end of said main body portion;
- a first fluid director member having essentially disc-shaped configuration with a central longitudinal axis and a dimension essentially corresponding to the interior cross sectional dimension of said main body portion;
- said first fluid director member having a plurality of openings;
- said first fluid director member being located in the interior of said cartridge between said particulate substance and said cover member of said main body portion, thereby constituting a distribution member for the water flowing through said particulate substance; and
- said first fluid director member comprising at least one recess projecting toward the particulate substance for receiving a piercing member penetrating said cover member without said first fluid director member being damaged; and
- a second fluid director member having essentially disc-shaped configuration with a central longitudinal axis and a dimension essentially corresponding to the interior cross sectional dimension of said main body portion;
- said second fluid director member having a plurality of openings;
- said second fluid director member being located in the interior of said cartridge between said particulate substance and said bottom portion of said main body portion, thereby constituting a collection member for the water flowing through said particulate substance; and
- said second fluid director member comprising at least one recess projecting toward the particulate substance for receiving a piercing member penetrating said bottom portion without said second fluid director member being damaged.

* * * * *